US007045763B2

(12) United States Patent
Ballard

(10) Patent No.: US 7,045,763 B2
(45) Date of Patent: May 16, 2006

(54) OBJECT-RECOGNITION LOCK

(75) Inventor: Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 10/186,458

(22) Filed: Jun. 28, 2002

(65) Prior Publication Data

US 2004/0000634 A1 Jan. 1, 2004

(51) Int. Cl.
*G06K 9/00* (2006.01)
*G06F 7/04* (2006.01)

(52) U.S. Cl. ................ 250/221; 250/559.22; 340/5.53; 340/5.83; 382/118

(58) Field of Classification Search ................ 250/221, 250/222.1, 559.22, 559.27; 340/5.51–5.53, 340/5.8; 356/71, 72; 382/108, 115, 117, 118, 382/124, 125
See application file for complete search history.

(56) References Cited

U.S. PATENT DOCUMENTS

| | | | | |
|---|---|---|---|---|
| 4,318,081 A | | 3/1982 | Yoshida | |
| RE33,553 E | * | 3/1991 | D'Agraiver et al. | 340/5.67 |
| 5,195,145 A | | 3/1993 | Backus et al. | |
| 5,578,813 A | | 11/1996 | Allen et al. | |
| 5,644,139 A | | 7/1997 | Allen et al. | |
| 5,729,008 A | | 3/1998 | Blalock et al. | |
| 5,786,804 A | | 7/1998 | Gordon | |
| 5,917,928 A | | 6/1999 | Shpuntov et al. | |
| 6,219,438 B1 | * | 4/2001 | Giordano et al. | 382/110 |
| 6,281,882 B1 | | 8/2001 | Gordon et al. | |
| 6,297,513 B1 | | 10/2001 | Oliver et al. | |
| 2002/0024418 A1 | * | 2/2002 | Ayala et al. | 340/5.26 |
| 2003/0161505 A1 | * | 8/2003 | Schrank | 382/118 |

FOREIGN PATENT DOCUMENTS

| | | |
|---|---|---|
| EP | 1 184 814 | 9/2000 |
| WO | WO 99/40841 | 8/1999 |
| WO | WO99/48041 | 9/1999 |
| WO | WO 01/04830 | 1/2001 |

OTHER PUBLICATIONS

Amended UK Search Report, pp. 1–3, dated Mar. 15, 2005.

* cited by examiner

*Primary Examiner*—Stephone B. Allen

(57) ABSTRACT

An object-recognition lock and method for operation thereof. According to one embodiment, the object-recognition lock comprises a scanner, the scanner generating at least one image signal indicative of a surface texture of an object. A controller is communicatively coupled to the scanner, the controller determining the surface texture from the at least one image signal, the controller comparing the surface texture of the object with a reference texture. A lock assembly is communicatively coupled to the controller, the lock assembly operable between a closed position and an open position by the controller when the surface texture of the object matches the reference texture.

24 Claims, 4 Drawing Sheets

OBJECT-RECOGNITION LOCK

FIELD OF THE INVENTION

The invention generally pertains to locks, and more specifically, to object-recognition locks.

BACKGROUND OF THE INVENTION

Locks are commonly provided as a security measure, such as to secure the entry doors to houses or other buildings. One type of lock comprises a lock cylinder operatively associated with a bolt that is provided in the door. A key can be inserted into the lock cylinder to actuate the bolt, extending it into the door frame to lock the door, or retracting it from the door frame to unlock the door. This type of lock is typically referred to as a deadbolt lock. Other types of locks are also commercially available.

Most locks are operable by a key. Typically the key is fabricated from a thin strip of metal that can be inserted into the lock cylinder. The key aligns pins in the lock cylinder so that the lock cylinder can be turned to actuate the bolt. Other types of keys include "smart cards" commonly used for hotel room doors, and key fobs commonly used for remote operation of car door locks.

Of course nearly everyone has locked their keys inside of their house or car at one time or another. Likewise, from time-to-time homeowners may want to leave a key out for their friend to use when the owner is away (e.g., to enter the home and care for their pets). Accordingly, many people will hide a spare key outside of the house that can be retrieved and used when the homeowner locks their key inside of the house or that their friend can use when the homeowner is away. Unfortunately, the hiding places that most people use are near the door (e.g., under the doormat) and are the first places that would-be thieves tend to look.

Combination locks offer an alternative to key-operated locks. Combination locks eliminate the need for a key and hence spare keys. However, drawbacks include the need to memorize the combination code, and the time it takes to enter the combination code each time the door needs to be opened. Once the combination code is known by someone else, the lock must be changed or a new combination code must be assigned to the lock to prevent later entry by the unauthorized individual having knowledge of the original combination code. In addition, combination locks, as with key-operated locks, can be "picked".

Pattern-recognition systems have also been developed that can be used to actuate locks in place of a key or a combination code. These systems may employ a laser that scans an object (e.g., a human eye) for unique patterns. Sophisticated software analyzes the unique pattern and actuates the lock when it recognizes the unique pattern. However, the types of unique patterns that these systems can identify are typically restricted (e.g., to only eyes). In addition, these systems are very expensive and therefore use is often limited to areas requiring extreme security measures.

SUMMARY OF THE INVENTION

According to one embodiment, an object-recognition lock may comprise a scanner, the scanner generating at least one image signal indicative of a surface texture of an object. A controller is communicatively coupled to the scanner, the controller determining the surface texture from the at least one image signal, the controller comparing the surface texture of the object with a reference texture. A lock assembly is communicatively coupled to the controller, the lock assembly operable between a closed position and an open position by the controller when the surface texture of the object matches the reference texture.

An embodiment is disclosed as a method for operating an object-recognition lock, comprising scanning an object for at least one surface texture of the object, comparing the at least one surface texture of the object with a reference texture, and actuating the lock assembly if the at least one surface texture of the object matches the reference texture.

BRIEF DESCRIPTION OF THE DRAWINGS

Illustrative and presently-preferred embodiments of the invention are illustrated in the drawings, in which.

DETAILED DESCRIPTION

Figure 1:
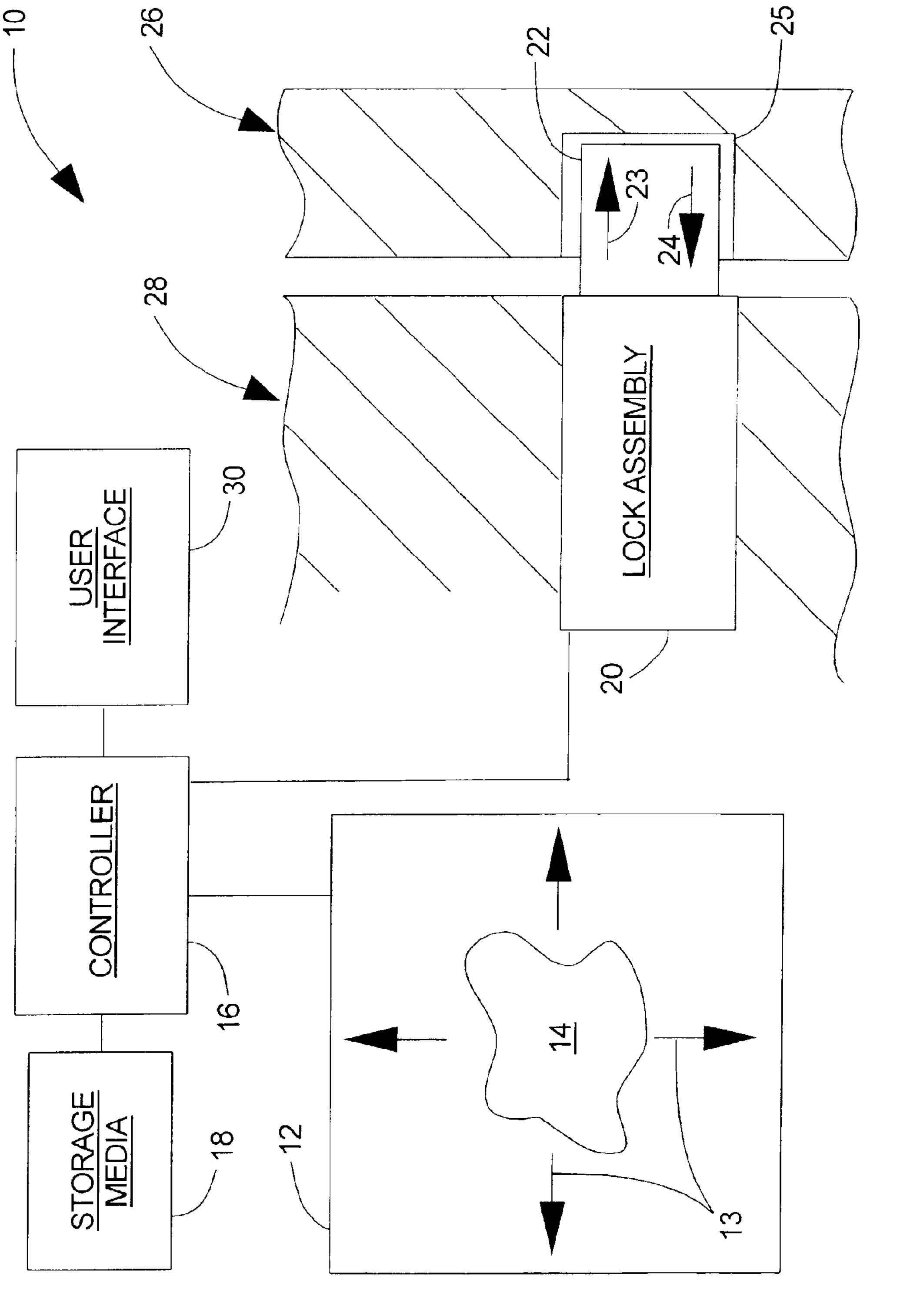
FIG. 1 is a high-level diagram showing one embodiment of an object-recognition lock.

One embodiment of the object-recognition lock 10 is shown in FIG. 1 comprising a scanner 12. Scanner 12 is communicatively coupled to a controller 16, which in turn is communicatively coupled to a lock assembly 20. The lock assembly 20 may be mounted in a door 28. When an object 14 is positioned adjacent the scanner 12, the scanner 12 generates an image signal indicative of the surface texture of object 14. If the surface texture of object 14 matches a reference texture previously stored in storage media 18, the controller 16 actuates the lock assembly 20 to lock or unlock the door 28. As will be discussed in more detail below, the surface texture and the reference texture are variations in the height and/or depth of various features on the surface at a micro-level (e.g., generally in the size range of 5 microns (μm) to 500 μm). A user interface 30 may also be provided for access by a user or administrator to establish and/or change various settings, as will be described in more detail below.

According to one embodiment, lock assembly 20 comprises a solenoid (not shown) operatively associated with a deadbolt lock. The solenoid may be operated by controller 16 to move a bolt 22 in the directions of arrows 23 and 24. For example, bolt 22 may be extended in the direction of arrow 23 into a notch 25 formed in a door frame 26 to lock the door 28. Alternatively, bolt 22 may be retracted in the direction of arrow 24 from the notch 25 formed in door frame 26 to unlock the door 28.

Of course it is understood that the invention is not limited to use with any particular type or style of lock assembly. Other lock assemblies can be readily adapted for use with object-recognition lock 10 of the present invention by one skilled in the art after having become familiar with the teachings of the present invention. In addition, as such lock assemblies are well-understood in the art and a further description of lock assembly 20 itself is not needed to understand and practice the invention, lock assembly 20 will not be described in further detail herein.

Scanner 12 may be any of a variety of scanners that are now known or that may be later developed. The scanner 12 may be provided in the general vicinity of door 28. For example, scanner 12 may be mounted to the door 28 just above or below the door handle. However, other embodiments are also contemplated as being within the scope of the invention. For example, scanner 12 need not be mounted to the door 28 and can be mounted to a wall adjacent the door, or in another area altogether (e.g., on a column or post in the entryway).

A suitable housing may be provided to protect the scanner 12 and/or for aesthetic reasons. For example, the housing may serve to keep dirt and/or water away from electronic circuitry of the scanner 12. The housing may also comprise a cover that can be closed to protect scanner 12 from the sun's ultra-violet (UV) radiation. The housing may be fabricated from any suitable material including, but not limited to, a hard plastic.

A controller 16 is communicatively coupled to scanner 12 and with storage media 18. The controller 16 is provided to receive the image signal from scanner 12 and compare the surface texture indicated by the image signal to a reference texture that is stored in the storage media 18.

Controller 16 may be linked to scanner 12 in any suitable manner (e.g., over a direct, networked, or remote connection). In addition, controller 16 and storage media 18 may be provided as an integrated circuit (IC). However, other embodiments are also contemplated as being within the scope of the invention and can readily be adapted for use with the object-recognition lock 10 of the present invention by one skilled in the art after having become familiar with the teachings of the invention.

Controller 16 may be provided in any suitable location. For example, controller 16 may be mounted in the same housing 34 that is provided for the scanner 12. According to preferred embodiments, however, controller 16 is provided apart from the scanner 12. For example, controller 16 may be provided inside of the building so that it cannot be tampered with and/or so that it is not exposed to unnecessary wear and tear.

Storage media 18 may comprise any suitable media that is now known or is later developed. For example, storage media 18 may comprise media such as a fixed medium, removable medium, or any combination thereof. Storage media 18 is well-understood in the art and can be readily adapted for use with the object-recognition lock 10 of the present invention.

The object-recognition lock 10 may also comprise a user interface 30 operatively associated with controller 16. User interface 30 may be accessed by a user or administrator to establish and/or change various settings. For example, user interface 30 may be accessed to establish object 14 as a "key". User interface 30 may also be accessed to override scanner 12 (i.e., to operate the lock assembly 20 without having to scan object 14). Other features of the user interface 30 will become apparent when operation of the object-recognition lock 10 is described below.

According to one embodiment, user interface 30 may be a keypad with a liquid crystal display (LCD). In other embodiments, user interface 30 may comprise a graphical user interface (GUI). For example, user interface 30 may be software that is executable on one or more personal computers (PCs) linked to controller 16 over a suitable network.

User interface 30 is preferably provided inside of the building (e.g., near controller 16) so that it cannot be tampered with and so that it is protected from the environment. However, in other embodiments the user interface 30 may be provided near the scanner 12 and a password may be required to access the user interface 30.

Figure 2:
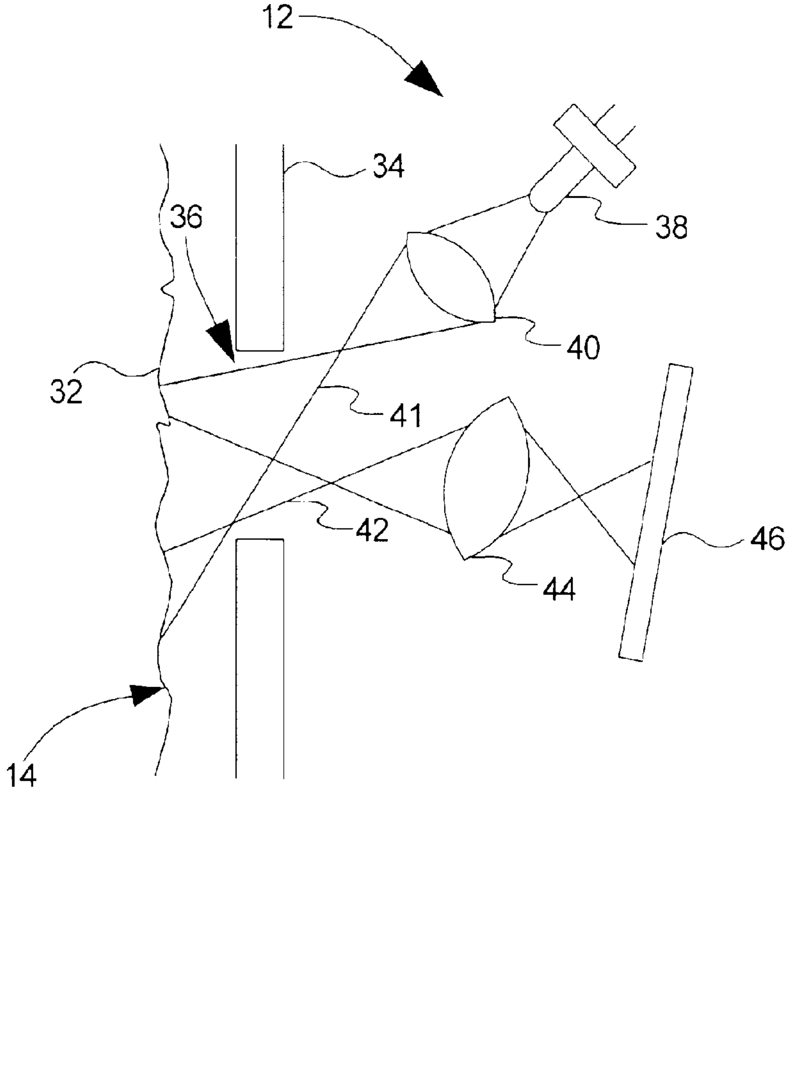
FIG. 2 illustrates one embodiment of a scanner for use with the object-recognition lock shown in FIG. 1.

According to one embodiment, scanner 12 may comprise one or more light emitting diodes (LEDs) 38 and an array of photo-detectors 46, as shown in FIG. 2. The LEDs emit light through an aperture 36 formed in housing 34 of the scanner 12. The emitted light illuminates a micro-textured surface 32 of object 14 when it is positioned adjacent scanner 12. The micro-textured surface 32 generally comprises very small ridges and valleys (e.g., generally in the range of about 5 μm to 500 μm). The light is reflected by the irregularities occurring on the micro-textured surface 32 and is projected onto the array of photo-detectors 46. The photo-detectors generate the image signal indicative of the micro-textured surface 32 of object 14.

The image signal may comprise values that indicate the height and/or depth of various features on the surface at a micro-level (e.g., generally in the size range of 5 microns (μm) to 500 μm). For example, the image signal may comprise relative measurements of height and/or depth. In another embodiment, the image signal may comprise scale values indicative of these variations. For example, a "1" may be assigned to variations that are less than 5 μm, a "2" may be assigned to variations that are between 5 μm and 10 μm, and so forth. In any event, it is these variations in features on the surface of the object 14, or the surface texture, which is compared to the variations in features on the surface which were previously recorded as the reference texture.

The scanner 12 may also comprise one or more lenses 40 to focus light emitted by the LEDs onto the micro-textured surface 32 of object 14, and one or more lenses 44 to focus reflected light onto photo-detectors 46. Of course any suitable lenses 40, 44 may be provided according to the teachings of the present invention. According to one embodiment, a transparent cover or window may optionally be provided over aperture 36 to protect the circuitry (e.g., LEDs 38 and photo detectors 46). The transparent cover may also function as one or more of the lenses 40, 44.

Scanner 12 may be provided with any suitable light source and is not limited to LED(s) 38 shown and described herein. In addition, the intensity and/or duration of emitted light may be changed based on various design considerations. For example, greater intensity may be provided to increase the detection capabilities of scanner 12. As another example, the light source may be pulsed to reduce power consumption (e.g., where batteries are used to power scanner 12).

Light source 38 may be positioned in any suitable manner to provide the desired illumination. According to one embodiment, light source 38 is positioned so that the emitted light has an angle of incidence in a range of about five to twenty degrees. However, the angle of incidence can be increased or decreased to change the detection capabilities of scanner 12.

The photo-detectors may be mounted to a circuit board (not shown), and positioned to detect the reflected light. As an illustration, a plurality of photo-detectors may be arranged as a two-dimensional array. The array may comprise a square configuration with twelve to twenty-four photo-transistors on each side. The photo-transistors may be spaced about 60 microns (μm) apart from one another on center and may each have a sensitive region of about 45 μm by 45 μm. It is noted, however, that the invention is not limited to such an embodiment.

Any suitable photo-detectors 46 may be used according to the teachings of the invention. In one embodiment, photo-detectors 46 may comprise photo-transistors. When light is detected by the photo-transistors, the photo-transistors charge capacitors. The voltages of the capacitors are digitized and stored in memory as the image signal.

Scanner 12 can be activated manually (e.g., by pressing a button) or automatically (e.g., when object 14 is sensed adjacent scanner 12). Suitable electronics for automatically activating scanner 12 are well-known in the art and can readily be adapted for use with the object-recognition lock 10 of the present invention. Of course in other embodiments scanner 12 may be "always-on".

The foregoing description of scanner 12 is provided in order to better understand one scanner which may be used according to the teachings of the present invention. However, it should be understood that the present invention may also be practiced in conjunction with other types and configurations of scanners that are now known or that may be developed in the future. Imaging technology suitable for use with the present invention is well-known in the art.

It is also understood that any suitable object 14 having a micro-textured surface 32 may be used according to the teachings of the invention. Examples of suitable objects include but are not limited to a rock or stone, a body part (e.g., an elbow, palm, or finger), wood, metal, or plastic objects, etc. Generally any object 14 can be used that has a micro-textured surface. According to preferred embodiments, the micro-textured surface 32 is not substantially altered over time or as a result of normal wear and tear of the object 14, such as a plant leaf may be altered by growth of the plant.

Briefly, the object-recognition lock 10 may be operated as follows. One or more reference textures may be established for one or more objects 14 that are desired to be used to actuate the lock assembly 20. The user may access controller 16 via user interface 30 and set it to a "pre-scanning" mode. Object 14 may then be scanned and the reference texture stored in storage media 18. Object 14 may subsequently be used as a "key" by positioning it adjacent the scanner 12. If the surface texture matches the reference texture, controller 12 actuates the lock assembly 20. Operation of the object-recognition lock 10 will now be described in more detail with reference to FIG. 3 and FIG. 4.

Figure 3:
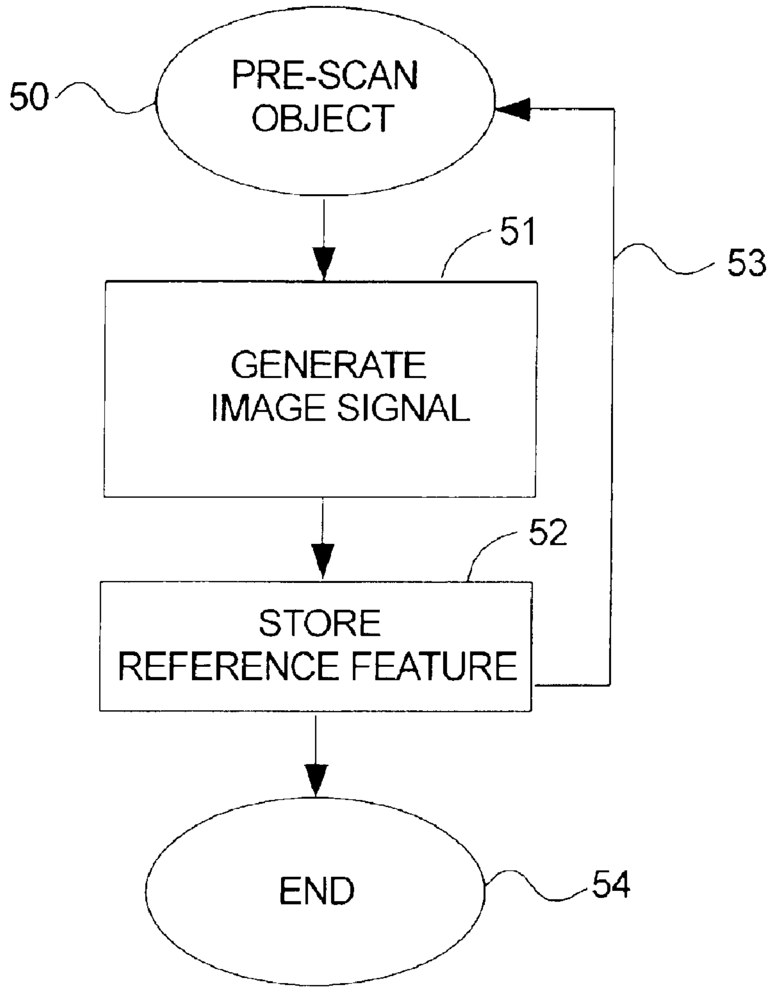
FIG. 3 is a flow chart illustrating one embodiment of a method for establishing a reference texture for the object-recognition lock according to the invention.

A reference texture may be established for use with the object-recognition lock 10 according to one embodiment of the invention and with reference to FIG. 3, as follows. Object 14 is pre-scanned in step 50 using scanner 12 (FIG. 1), an image signal indicative of the reference texture is generated in step 51 and received by controller 16, and the reference texture is stored in step 52 in storage media 18. When it is desired to establish additional reference textures for use with the object recognition lock 10, or where it is desired to enlarge the surface area of the reference texture, steps 50 through 52 may be repeated, as indicated by arrow 53. In addition, steps 50 through 52 may be repeated to generate a higher-quality image signal (e.g., where object 14 was improperly scanned in step 50 or where the image signal was not correctly received by controller 16). After the reference texture(s) have been established, the user may activate the object-recognition lock 10 and exit the system in step 54.

Scanner 12 may be operated, according to one embodiment of the invention, as follows to scan object 14. Object 14 is positioned adjacent scanner 12 and the light source 38 (e.g., LEDs) projects light 41 onto the micro-textured surface 32 of object 14. Light is reflected from the micro-textured surface 32 and reflected light 42 is projected onto the array of photo-detectors 46. Where the photo-detectors are photo-transistors, capacitors (not shown) are charged and the voltages of the capacitors are digitized, hence generating the image signal that is delivered to controller 16.

According to one embodiment, object 14 may be pre-scanned as follows. Object 14 is held substantially motionless adjacent scanner 12 as object 14 is scanned. The object 14 may be held motionless where only a portion of object 14 needs to be scanned or where the object 14 is small enough that the surface to be scanned can be held adjacent the scanner 12. For example, the object 14 may be placed on a resting surface so that it remains motionless while it is scanned.

Alternatively, the user may move object 14 across the scanner 12 (e.g., in the directions of arrows 13 shown in FIG. 1) to scan additional surface textures of object 14 (i.e., repeating steps 50 through 52). For example, object 14 may be moved where the surface to be scanned is larger than scanner 12. Also for example, object 14 may be moved (e.g., rotated) to scan a curved surface or to scan more than one surface (e.g., a multi-dimensional object).

In one embodiment of the invention, the sequence in which the image signals are generated does not affect operation of the lock assembly 20. That is, a plurality of image signals representative of various portions of the surface 32 may be generated (e.g., as the object 14 is moved across the scanner 12) and combined by controller 16 to assemble a coherent image or "map" of the surface 32. Suitable algorithms for determining overlap between the image signals and for assembling the image signals into a coherent image are well-known in the art and therefore are not discussed in further detail herein.

Of course in other embodiments, a particular sequence for generating the image signals may be desired to operate the lock assembly 20. For example, the user may scan a predetermined first side of object 14, and then a predetermined second side of object 14 as an additional security measure.

According to yet other embodiments for operation of the invention, the reference texture may be established as a temporary "key". For example, the user may establish the palm of a friend's hand as a reference texture so that the friend can operate the lock assembly 20 while the homeowner is on vacation. Upon the homeowner's return, the friend's palm will no longer work to operate the lock assembly 20. According to one such embodiment, the user may specify an expiration event for the reference texture. For example, the user may, via user interface 30, assign an expiration time of 12:30 p.m. on the following Monday, at which time, the reference texture is erased from the storage media 18, or otherwise made inaccessible for comparison. Another expiration event may be the number of times a particular object 14 is used to operate the lock assembly 20. Yet other expiration events may also be assigned for the reference texture.

Figure 4:
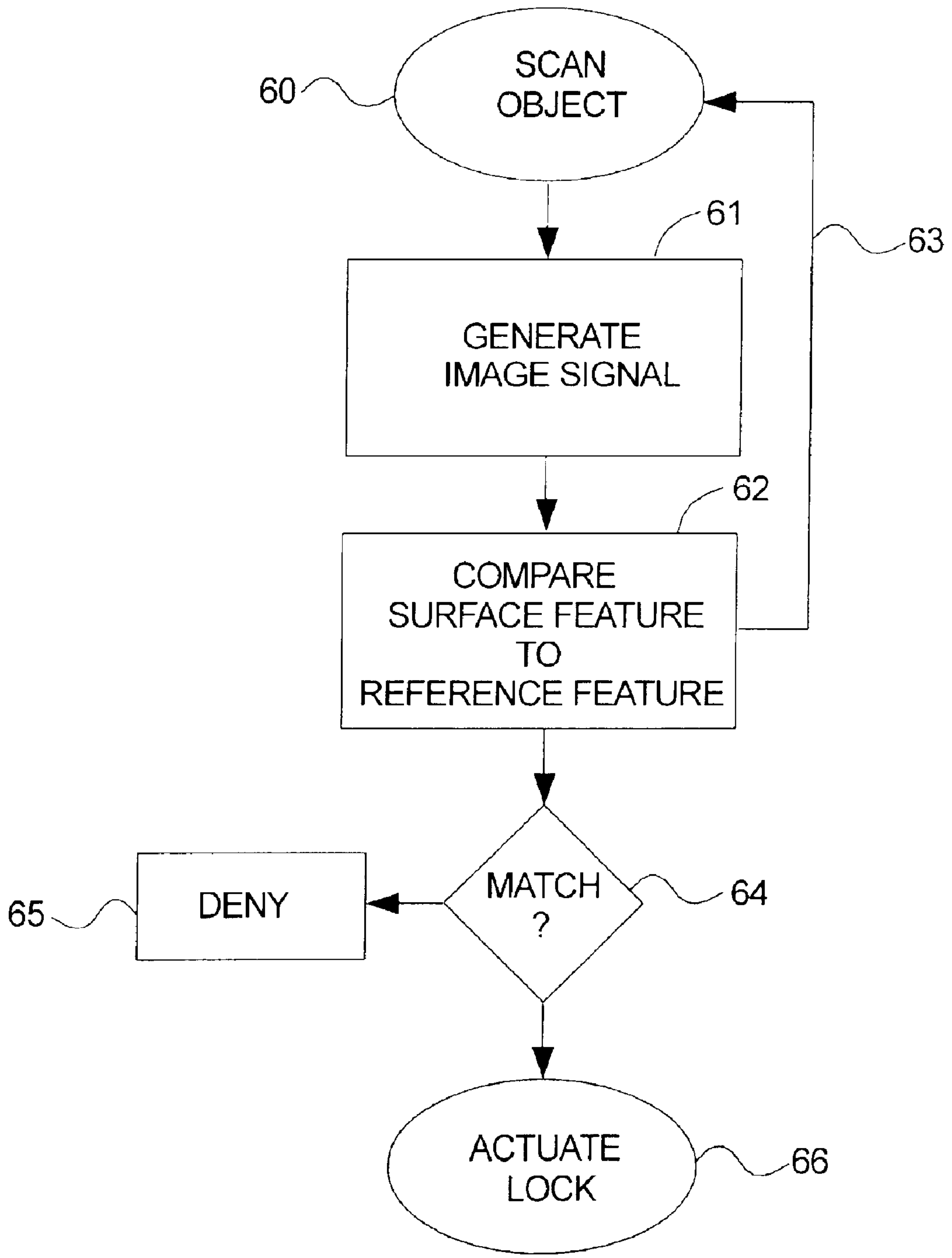
FIG. 4 is a flow chart illustrating one embodiment of a method for operating the object-recognition lock according to the invention.

After the reference texture has been established, the lock assembly 20 may be actuated, according to one embodiment of the invention and with reference to FIG. 4, as follows. The object 14 may be scanned in step 60 in any suitable manner, such as previously discussed for establishing the reference texture. An image signal 61 indicative of the surface texture of the scanned object 14 is generated by scanner 12 in step 61. Controller 16 receives the image signal and compares the surface texture of the scanned object 14 to the reference texture in step 62. Steps 60 through 62 may be repeated for any of a variety of reasons, as indicated by arrow 63.

If the surface texture does not match the reference texture in step 64, access is denied in step 65 (i.e., the lock assembly 20 is not actuated). Optionally, an audible and/or visual signal may be produced to indicate that access is denied.

If the surface texture substantially matches the reference texture in step 64, the lock assembly 20 is actuated in step 66. For example, when the surface texture matches the reference texture, controller 16 may actuate a solenoid that causes bolt or pin 22 to extend into the notch 25 formed in the door frame 26 to lock door 28 (e.g., in the direction of arrow 23 shown in FIG. 1). Alternatively, controller 16 may actuate the solenoid and cause pin 22 to withdraw from the notch 25 to unlock door 28 (e.g., in the direction of arrow 24 shown in FIG. 1).

The definition of matching the surface texture to the reference texture is established before the controller compares the surface texture of the object to the reference texture. In one embodiment, the user may establish the desired sensitivity (e.g., via the user interface 30). For example, the user may specify that at least 80% of the surface texture must match the reference texture before the lock assembly can be actuated.

Of course the determination of whether the surface texture substantially matches the reference texture may depend on various design considerations. For example, greater security may be provided where a more exact match between the surface texture and the reference texture is required. However, a more exact match may also cause false denials of entry (e.g., where the object 14 has been scratched).

Other embodiments of the method for operating the object-recognition lock 10 are also contemplated as being within the scope of the invention. For example, controller 12 may also be adapted to automatically open door 28 after actuating the lock assembly 20. In yet other embodiments, controller 12 may be adapted to record various events, such as the time when lock assembly 20 is actuated, the number of retries before lock assembly 20 was actuated, etc.

It is readily apparent that the object-recognition lock 10 of the present invention represents an important development in the field of locks in general, and more particularly to object-recognition locks. The object-recognition lock 10 enables nearly any object 14 or objects to be used to operate the object-recognition lock 10 of the present invention. As an illustration, a particular rock that only the homeowner knows of may be used to open door 28 when the homeowner is locked out, eliminating the need to hide a spare key. As another illustration, the palm of each resident can be used to operate the object-recognition lock 10, eliminating the need for each of the residents to carry a key with them. In each instance, the surface texture of the object 14 is used to determine whether the user is an authorized user. The object-recognition lock 10 is also less susceptible to being picked. Furthermore, the object-recognition lock 10 is relatively inexpensive, making it a viable alternative to key-operated locks.

What is claimed is:

1. A method for operating an object-recognition lock, comprising:

scanning an object for at least one surface texture of the object;

generating at least one image signal indicative of the at least one surface texture;

comparing the at least one surface texture of the object indicated by the at least one image signal with a reference texture; and actuating the lock if the at least one surface texture of the object matches the reference texture, wherein comparing the at least one surface texture of the object indicated by the at least one image signal with the reference texture comprises comparing the at least one surface texture with the reference texture at a micro-level in which depths of features of the surface texture and features of the reference texture are in a range of 5 microns to 500 microns.

2. The method of claim 1, further comprising:

pre-scanning the object to obtain the reference texture; and storing the reference texture for subsequent comparison to the at least one surface texture.

3. The method of claim 1, further comprising combining said at least one image signal with another image signal to determine the at least one surface texture.

4. The method of claim 1, further comprising:

automatically opening a door after actuating the lock.

5. A method as in claim 1, further comprising recording at least one event for the lock.

6. The method of claim 1, further comprising:

assigning an expiration event for the reference texture.

7. The method of claim 6, wherein the reference texture is not useable for actuating the lock after occurrence of the expiration event.

8. An apparatus comprising:

a scanner, said scanner generating at least one image signal indicative of a surface texture of an object;

a controller communicatively coupled to said scanner, said controller determining said surface texture from said at least one image signal, said controller comparing said surface texture of said object with a reference texture;

a lock assembly communicatively coupled to said controller, said lock assembly operable between a closed position and an open position by said controller when said surface texture of said object matches said reference texture; and a user interface operatively associated with said controller, said user interface operable to establish and change settings for said controller.

9. The apparatus of claim 8, wherein a said surface texture is a micro-textured surface texture.

10. The apparatus of claim 8, wherein said scanner generates an image signal indicative of said surface texture based on reflected light received by a photo-detector.

11. The apparatus of claim 8, wherein said scanner is automatically activated when said object is positioned adjacent to said scanner.

12. The apparatus of claim 8, wherein said scanner is manually activated.

13. An apparatus comprising:

a scanner, said scanner generating at least one image signal indicative of a surface texture of an object;

a controller communicatively coupled to said scanner, said controller determining said surface texture from said at least one image signal, said controller comparing said surface texture of said object with a reference texture; and a lock assembly communicatively coupled to said controller, said lock assembly operable between a closed position and an open position by said controller when said surface texture of said object matches said reference texture, wherein said controller combines said at least one image signal with another image signal to determine said surface texture of said object.

14. The object apparatus of claim 13, wherein a definition for matching is established for use by said controller before said controller compares said surface texture with said reference texture.

15. The apparatus of claim 13, further comprising a storage medium operatively associated with said controller, said storage medium storing said reference texture.

16. An apparatus comprising:

a scanner, said scanner generating at least one image signal indicative of a surface texture of the object;

a controller communicatively coupled to said scanner, said controller determining said surface texture from said at least one image signal, said controller comparing said surface texture of said object with a reference texture; and a lock assembly communicately coupled to said controller, said lock assembly operable between a closed position and an open position by said controller when said surface texture of said object matches said reference texture, wherein said object is one of a plurality of objects operable to actuate said lock assembly, wherein at least one of said plurality of objects is established as a temporary keyu for said lock assembly.

17. The apparatus of claim 16, wherein said controller automatically opens a door after said lock assembly is in the open position.

18. An object-recognition lock comprising:

means for generating an image signal indicative of at least one surface texture of an object;

means for comparing said at least one surface texture indicated by said image signal with a reference texture at a micro-level, wherein depths of the features at the micro-level are in a range of 5 microns to 500 microns; and means for actuating said lock when said at least one surface texture of said object matches said reference texture.

19. The lock of claim 18, further comprising means for storing said reference texture, said means for comparing accessing said reference texture from said means for storing.

20. An apparatus, comprising:

a scanner, said scanner generating at least one image signal indicative of a surface texture of an object;

a controller communicatively coupled to said scanner, said controller determining said surface texture from said at least one image signal, said controller comparing said surface texture of said object with a reference texture; and a lock assembly communicatively coupled to said controller, said lock assembly operable between a closed position and an open position by said controller when said surface texture of said object matches said reference texture, wherein the controller is adapted to compare features of the surface texture based on the at least one image signal with features of the reference texture at a micro-leve, wherein depths of the features at the micro-level are in a range 5 microns to 500 microns.

21. An apparatus comprising:

a scanner to generate image data representative of a surface texture of an object;

a controller to compare the surface texture based on the image data with a reference texture; and a lock assembly operable by the controller in response to the comparing of the surface texture and the reference texture, wherein the controller is adapted to compare features of the surface texture with feature of the reference texture at a micro-level, the features at the micro-level having depths in a range between 5 and 500 microns.

22. The apparatus of claim 21, wherein the scanner is automatically activated when the object is sensed adjacent the scanner.

23. The apparatus of claim 21, wherein the reference texture is generated by scanning the object.

24. The apparatus of claim 21, wherein the reference texture has an expiration time at which time the reference texture is not available for a comparison to the surface texture.

* * * * *

UNITED STATES PATENT AND TRADEMARK OFFICE

CERTIFICATE OF CORRECTION

PATENT NO. : 7,045,763 B2 
APPLICATION NO. : 10/186458
DATED : May 16, 2006
INVENTOR(S) : Curtis C. Ballard It is certified that error appears in the above-identified patent and that said Letters Patent is hereby corrected as shown below:

In column 8, line 19, in Claim 8, after “apparatus” insert -- , --.

In column 8, line 35, in Claim 9, after “wherein” delete “a”.

In column 8, line 45, in Claim 13, after “apparatus” insert -- , --.

In column 8, line 61, in Claim 14, delete “object” before “apparatus”.

In column 9, line 1, in Claim 16, after “apparatus” insert -- , --.

In column 9, line 3, in Claim 16, after “texture of” delete “the” and insert -- an --, therefor.

In column 9, line 10, in Claim 16, delete “communicately” and insert -- communicatively --, therefor.

In column 9, line 18, in Claim 16, delete “keyu” and insert -- key --, therefor.

In column 9, line 22, in Claim 18, after “lock” insert -- , --.

In column 10, lines 13-14, in Claim 20, delete “micro-leve” and insert -- micro-level --, therefor.

In column 10, line 15, in Claim 20, after “range” insert -- of --.

In column 10, line 26, in Claim 21, delete “feature” and insert -- features --, therefor.

Signed and Sealed this

Fifth Day of May, 2009

JOHN DOLL

*Acting Director of the United States Patent and Trademark Office*